United States Patent [19]

Sekiya

[11] Patent Number: 5,526,436
[45] Date of Patent: Jun. 11, 1996

[54] IMAGE DETECTING APPARATUS FOR AN INDIVIDUAL IDENTIFYING SYSTEM

[75] Inventor: Takaomi Sekiya, Tokyo, Japan

[73] Assignee: Asahi Kogaku Kogyo Kabushiki Kaisha, Yokyo, Japan

[21] Appl. No.: 261,968

[22] Filed: Jun. 17, 1994

[30] Foreign Application Priority Data

Jun. 17, 1993 [JP] Japan .................................. 5-145953
Jun. 21, 1993 [JP] Japan .................................. 5-148775

[51] Int. Cl.⁶ ............................................. G06K 9/00
[52] U.S. Cl. .................................... 382/115; 356/71
[58] Field of Search ..................... 356/71; 382/2–4, 382/115, 116, 126, 127, 124, 125

[56] References Cited

U.S. PATENT DOCUMENTS

| | | | |
|---|---|---|---|
| 3,581,282 | 5/1971 | Altman | 382/4 |
| 4,032,889 | 6/1977 | Nassimbene | 382/115 |
| 4,186,378 | 1/1980 | Moulton | 382/4 |
| 4,206,441 | 6/1980 | Kondo | 356/71 |
| 4,357,597 | 11/1982 | Butler | 382/4 |
| 4,371,865 | 2/1983 | Moulton | 382/4 |
| 4,468,807 | 8/1984 | Moulton | 382/4 |
| 4,537,484 | 8/1985 | Fowler et al. | 356/71 |
| 4,553,837 | 11/1985 | Marcus | 356/71 |
| 4,641,349 | 2/1987 | Flom et al. | 382/117 |
| 4,783,167 | 11/1988 | Schiller et al. | 356/71 |
| 4,821,118 | 4/1989 | Lafreniere | 382/4 |
| 5,177,802 | 1/1993 | Fujimoto et al. | 356/71 |
| 5,289,253 | 2/1994 | Costello et al. | 356/71 |

OTHER PUBLICATIONS

"An Experiment on Personal Identification for Gate Security Using Hand Shape and Palm–Print", *Journal of the Electronic Information Communication Society* D–II, vol. J74-d-II No. 6, pp. 688–697 (1991) and a English Translation of Document.

"Lighting & Viewing Techniques", Batchelor, B. G., Automated Visual Inspection (1985).

*Primary Examiner*—Leo Boudreau
*Assistant Examiner*—Phuoc Tran
*Attorney, Agent, or Firm*—Greenblum & Bernstein

[57] ABSTRACT

An image detecting apparatus is used to detect an image of a pattern of lines on a palm. The image detecting apparatus has an optical transparent block which has a refractive index greater than that of a surrounding medium. The optical transparent block also has a convex curved surface on which the palm is placed. The image detecting apparatus further includes a light source for emitting light towards the convex curved surface through the optical transparent block, and an image sensor is provided for detecting at least the light reflected from the convex curved surface.

24 Claims, 17 Drawing Sheets

FIG. I
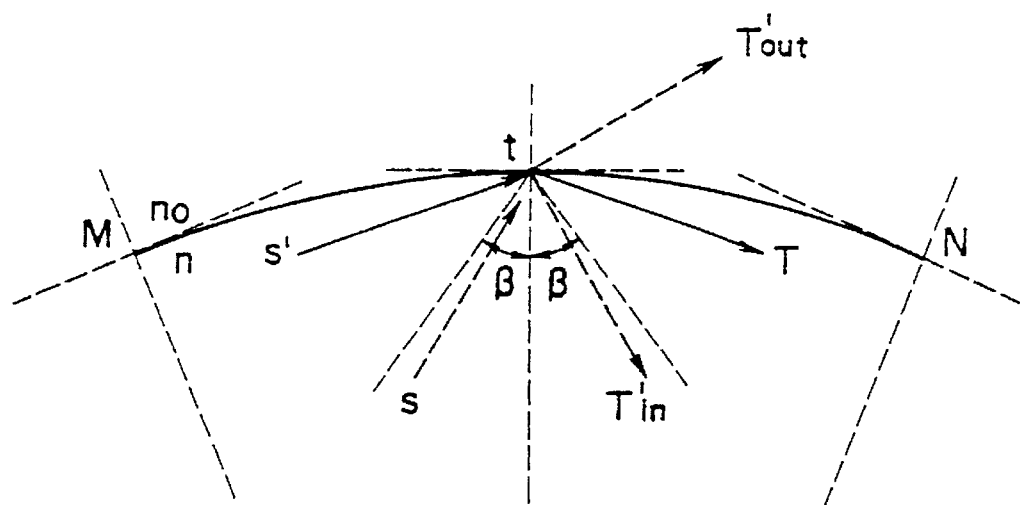
FIG. 2
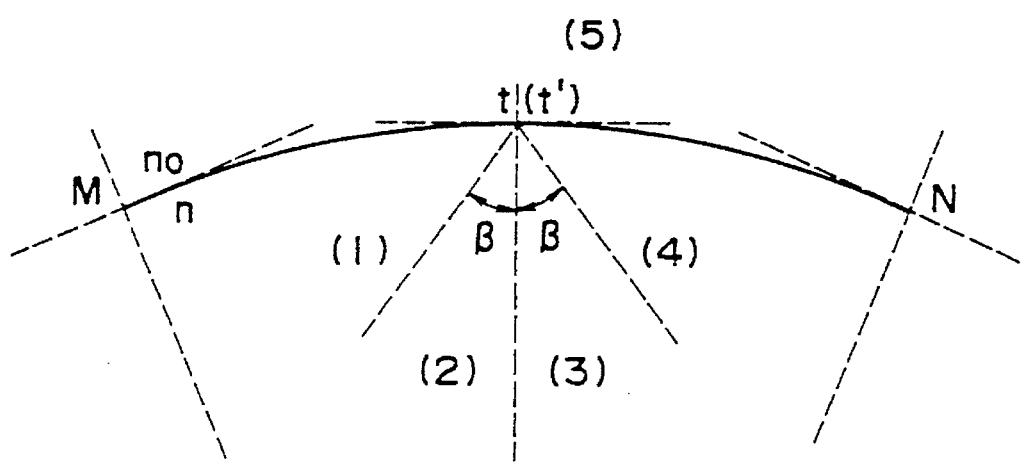

F I G. 16
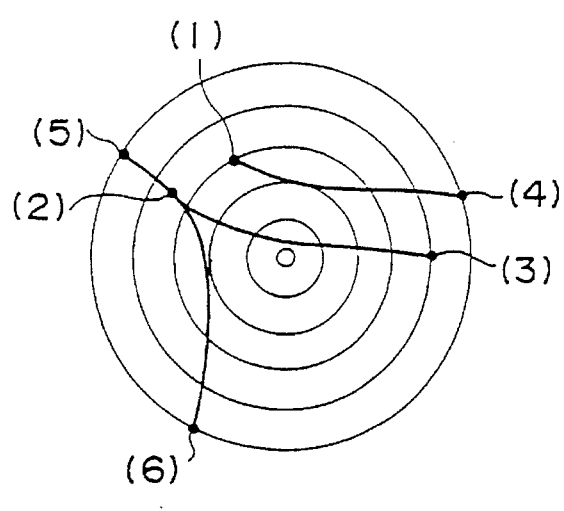
F I G. 17
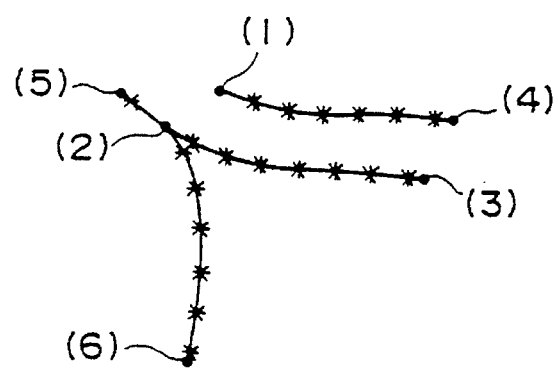
F I G. 18
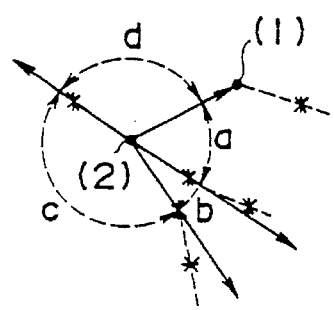

F I G. 19
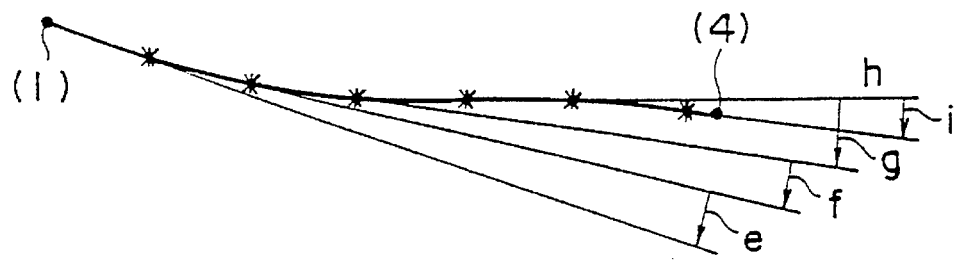
F I G. 20
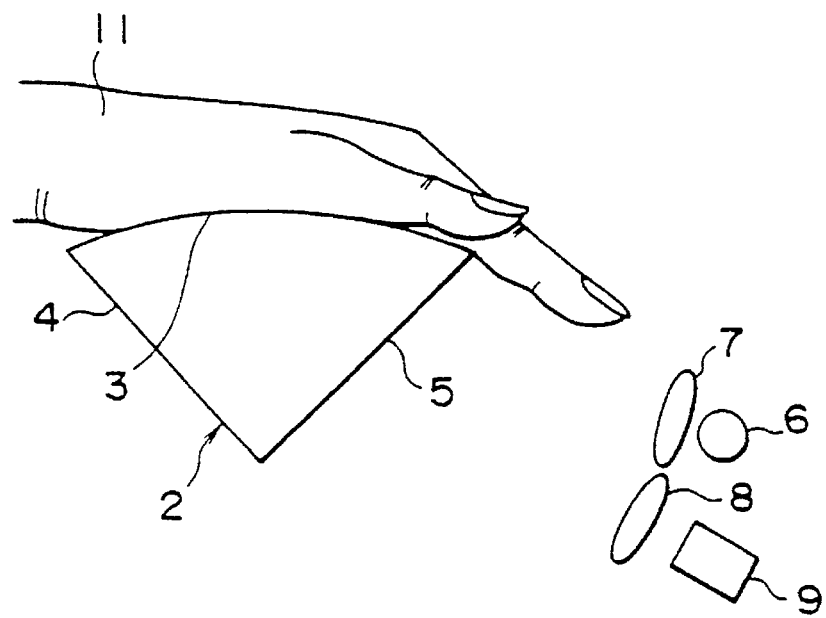

5,526,436

IMAGE DETECTING APPARATUS FOR AN INDIVIDUAL IDENTIFYING SYSTEM

BACKGROUND OF THE INVENTION

The present invention relates an image detecting apparatus used to detect a pattern of lines on a palm of a hand which may be used in a security system, for example, to determine whether a person should be given access to a secure area.

A human palm has three main lines, known as the Head line, Heart Line and Life Line in palmistry. The patterns of lines on the palm, including these three lines, are unique for each person, and therefore, the patterns formed by these lines can be used as a basis for identifying different people.

Conventional palm line or palm line pattern reading devices are known, as described in U.S. Pat. No. 4,032,889, and utilize a mechanical scanning system in which a group of mechanical line sensors scan the surface of the palm in order to detect the lines of the palm. However, the mechanical scanning system cannot read the palm lines or patterns quickly since the surface of the palm is a complicated shape. Further, the size of the mechanical line sensors and the distance between the mechanical line sensors result in the scanning system having a low resolution, thereby reducing the accuracy of the palm line pattern that is detected.

Another method for detecting a palm line pattern that has been proposed uses an optical scanning system. In this system, the palm is placed on a flat glass surface similar to a document glass of a plain-paper copying machine in order to scan the palm. However, this system is unable to read the entire area of the palm due to insufficient contact between the glass surface and the palm. Therefore, portions of the lines which do not contact the glass may not be read or will have a low contrast, thereby reducing the accuracy of the image of the scanned palm.

SUMMARY OF THE INVENTION

It is therefore an object of the present invention to provide an image detecting apparatus that is capable of scanning a palm quickly and accurately.

According to one aspect of the present invention, there is provided an image detecting apparatus used to detect an image of a pattern of lines on a palm, which includes the following components:

An optical transparent block having an index of refraction which is greater than an index of refraction of a medium surrounding the optical transparent block, the optical transparent block having a convex curved surface on which the palm is placed;

a light emitting mechanism for emitting light towards the convex curved surface, the light emitting mechanism positioned such that the emitted light is incident on the curved surface from within the optical transparent block; and an image sensing mechanism for detecting at least light reflected by the convex curved surface.

According to another aspect of the present invention, there is provided an individual identifying system, which includes the following components.

A mechanism for detecting a pattern of lines on a palm;

a mechanism for extracting characteristics of the pattern;

a mechanism for storing the characteristics; and a mechanism for comparing characteristic of an individual with the characteristics stored in the storing mechanism.

BRIEF DESCRIPTION OF THE DRAWINGS

FIG. 1 is a ray diagram showing a light path of light transmitted between a prism and air;

FIG. 2 is a ray diagram showing the conditions to achieve total internal reflection for the light path shown in FIG. 1;

FIG. 16 shows significant points of the image of FIG. 15C;

FIG. 17 shows the significant values, which are extracted from the significant points shown in FIG. 16 interpreted as coordinates;

FIG. 18 shows the significant values, which are extracted from the significant points shown in FIG. 16, interpreted as vectors which connect the significant points;

FIG. 19 shows the significant values as the angles made up of line segments connecting the dividing points;

FIG. 20 shows a schematic drawing of a prism, light source and detector according to a second embodiment of the present invention;

DESCRIPTION OF THE EMBODIMENTS

FIG. 1 shows a ray diagram of the light paths of incident light, refracted light and reflected light when light is incident on a boundary of two media having different indices of refraction.

In FIG. 1, M and N are two points on the boundary. The media having a refractive index n is of an optically transparent material such as glass or acrylic and is formed in the shape of a prism, while the media having refractive index $n_0=1$ is air. In this embodiment, $n>n_0$, and the boundary surface MN protrudes into the air. The critical angle $\beta$ at an arbitrary point t on the boundary surface MN is an angle measured from the line normal to the tangential line at point t, and is given by equation (1):

$$\beta \approx \sin^{-1}(1/n) \tag{1}$$

The incident light rays S' from inside the prism have an incident angle greater than the critical angle $\beta$, and will therefore be reflected according to the theory of total internal reflection. However, the light rays S have an incident angle that is smaller than the critical angle $\beta$, and thus some of the light rays are transmitted (i.e., refracted rays $T'_{out}$) while the remaining rays are reflected (i.e., $T'_{in}$).

As shown in FIG. 2, the light rays which are reflected according to total internal reflection are transmitted through regions (1) and (4), whereas the light rays which are refracted are transmitted through regions (2), (3) and (5).

Figure 3:
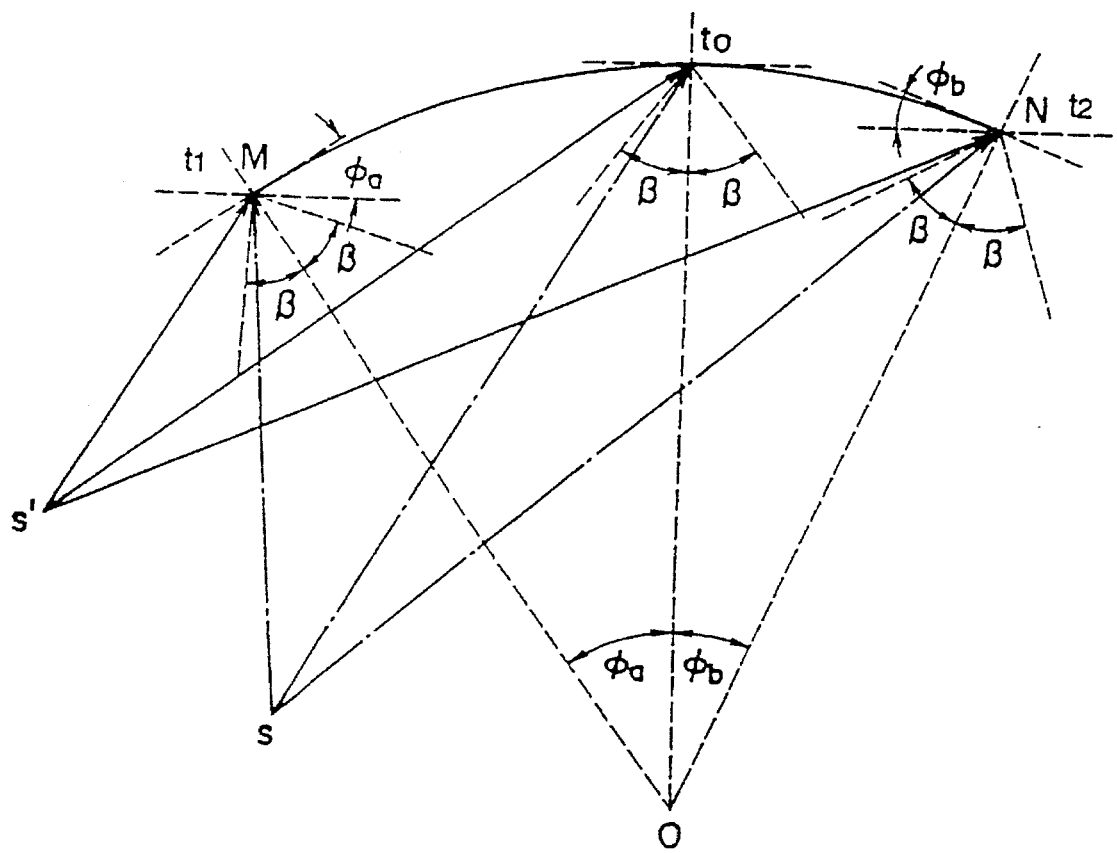
FIG. 3 shows a relationship between a position of a light source and a critical angle of incidence of the light path for different points along a boundary of the prism and the air.

FIGS. 1 and 2 describe light incident at point t, however, the ray diagram can be applied to all points along the boundary surface MN. Three points receiving incident light are shown in FIG. 3. The normal lines (the radius when the curvature is a spheric surface) at the two points $t_1$ and $t_2$ are inclined by angles $\phi_a$ and $\phi_b$, respectively with reference to the normal line at point $t_0$. The relative reflection or transmission angles of the incident light rays, as measured from point 0, vary at each point along the boundary surface MN while the critical angle $\beta$ remains unchanged. Therefore, the regions (1) through (5), as defined in FIG. 2, change for each point along the boundary surface MN.

For example, when a point light source emits light rays S as shown in FIG. 3, the incident light rays travel along the dot-dash lines in the drawing, and are incident along all points of the boundary surface MN with an angle that is smaller than the critical angle $\beta$. Therefore, for light rays S, a portion of the light rays incident on the boundary surface MN will be transmitted across the boundary surface MN, and into the air.

If the point light source emits light rays S' as shown in FIG. 3, the illuminating light rays travel along the solid lines in the drawing, and are incident along all points of the boundary surface MN with an angle that is larger than the critical angle $\beta$. Therefore, for the light rays S', all of the light rays incident on the boundary surface MN will be totally internally reflected.

Figure 4:
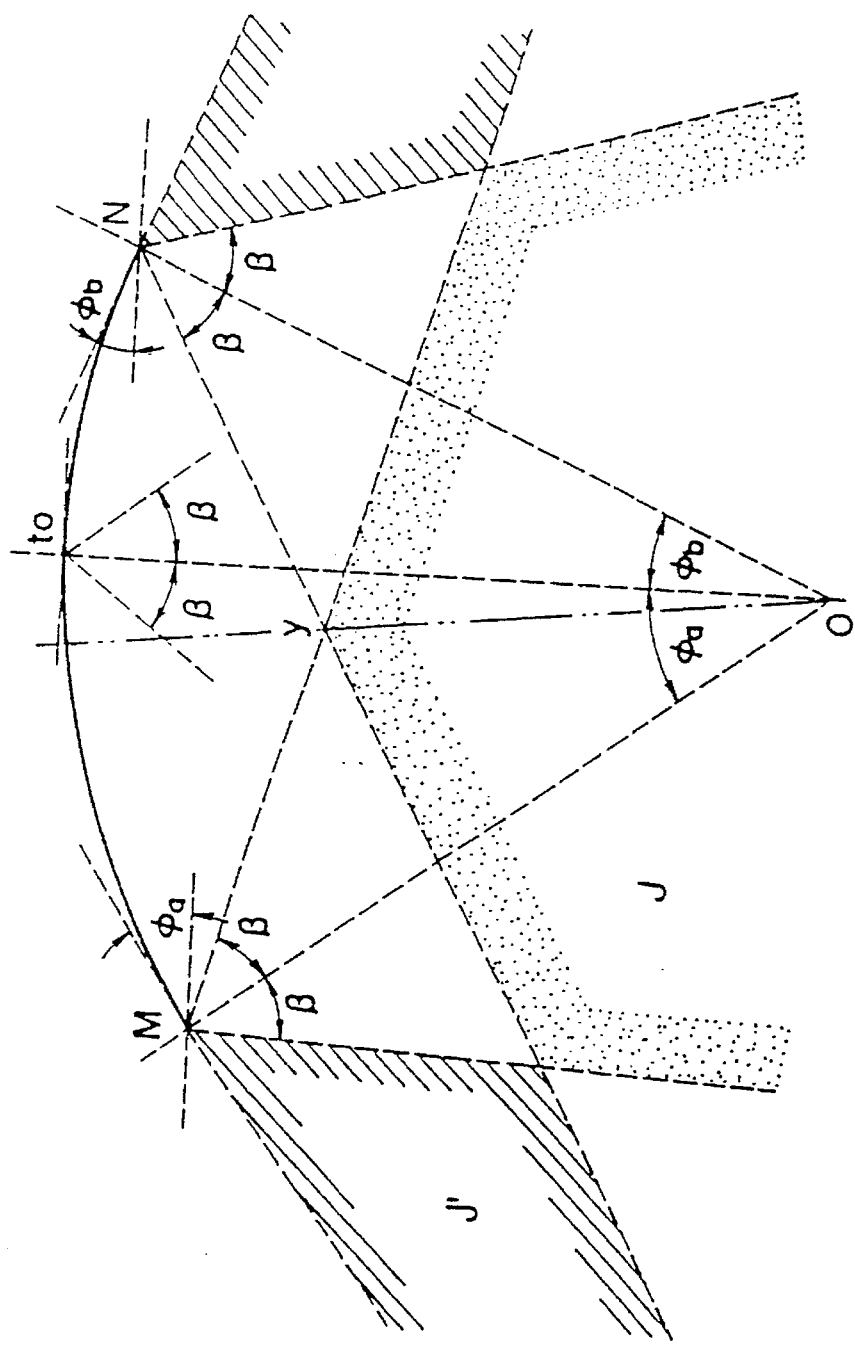
FIG. 4 shows areas where the light source may be positioned in order to satisfy requirements for total internal reflection.

FIG. 4 shows the dotted region J where the light source may be positioned, so that some of the light incident on the boundary surface MN is transmitted to the air, for light incident at all points along the boundary surface MN. The hatched region J' indicates an area where the light source may be positioned so that all of the light incident at all points along the boundary surface MN is totally internally reflected.

FIG. 4 shows a cross-section of the prism. However, the prism is three-dimensional, and therefore, the dotted region J and the hatched region J' are actually volumes that are defined by rotating the respective areas about the axis OY.

Figure 5:
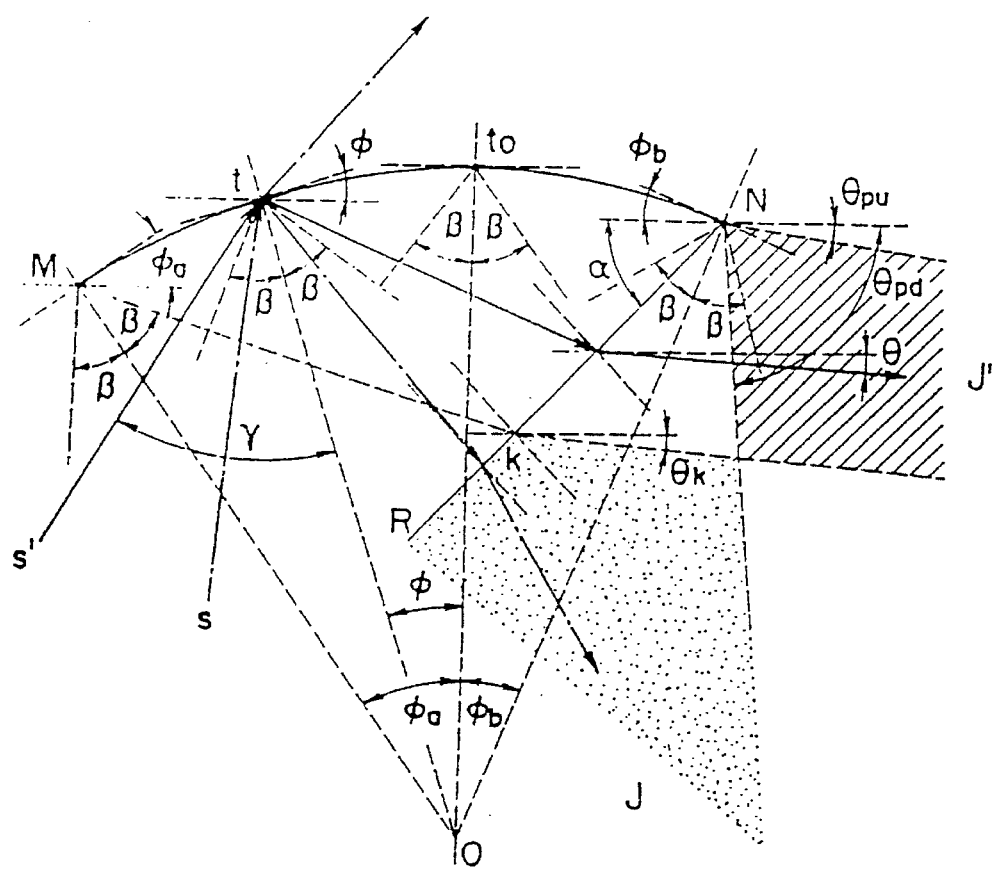
FIG. 5 shows an area where light which is reflected at the boundary as a result of total internal reflection, exits the prism.

In FIG. 5, the emerging angle $\theta$, defined as an angle between the standard tangential line (i.e., tangent at $t_0$) and the light ray which emerges from the boundary surface RN after reflection at point t. $\theta$ is given by equation (2) below:

$$\theta=(\pi/2)-\alpha+\sin^{-1}\{n \sin (\alpha-\gamma-\phi)\} \tag{2}$$

where $\gamma$ is an angle of incidence at point t, $\alpha$ is an angle between the standard tangential line and the terminal plane RN at $t_0$, $\phi$ is a positive angle (when measured in the counterclockwise direction) between the tangent at $t_0$ and tangent at t. The angles between the tangent at $t_0$ and the tangents at points M and N, are $\phi a$ and $\phi b$ respectively, and defined as $\phi a>0$, $\phi b<0$.

The total internal reflection of the incident light ray at point t will occur if $\beta<\gamma<\pi/2$, otherwise the incident light ray is not totally internally reflected. As shown in equation (2), if $\gamma\approx\beta$, then the light rays emerge from the boundary surface RN at point k, at an angle of $\theta_k$.

When the angle of incidence is greater than the critical angle $\beta$, the emerging angle $\theta$ becomes smaller than $\theta_k$; conversely, if the angle of incidence is smaller than the critical angle $\beta$, the emerging angle $\theta$ becomes larger than $\theta_k$.

Similarly, the emerging angle $\theta$ of the light rays, which are incident at point N with an angle greater than the critical angle $\beta$, is defined in the range $\theta_{pu}<\theta<\theta_{pd}$. $\theta_{pu}$ is the emerging angle of the light ray which is incident at point N, when the incident angle $\gamma$ is at the limit of $\pi/2$. $\theta_{pd}$ is the emerging angle of the light ray which is incident at point N, when the incident angle $\gamma$ is at the limit of the critical angle $\beta$. If the angle of incidence at point N is less than the critical angle $\beta$, then the emerging angle $\theta$ is defined as $\theta>\theta_{pd}$.

Figure 6:
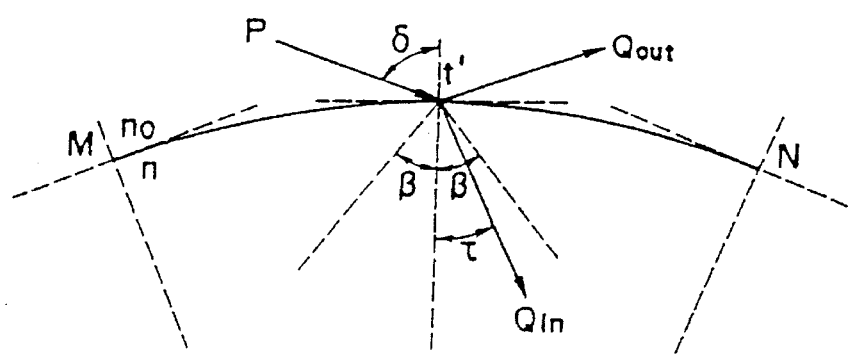
FIG. 6 shows a ray diagram of a light path of light incident on the boundary when the light travels from the air to the prism.

FIG. 6 shows light incident on the air side of the boundary MN. The incident light ray P, having an incident angle $\delta$ measured from the normal line through point t', is divided into the ray $Q_{out}$ which is reflected by the boundary MN, and the refracted rays $Q_{in}$ which travel into the prism at an angle $\tau$. If the angle of incidence $\delta$ varies from 0 (zero) to $\pi/2$, the angle of refraction $\tau$ varies from 0 (zero) to $\beta$. Therefore, the range of the angle of the refracted rays $Q_{in}$ is limited to regions (2) and (3), as shown in FIG. 2. These regions vary depending on the variation in the angle of the normal lines (measured with respect to the normal at $t_0$) of each point along the boundary surface MN. Further, all the light rays incident at any point along on the boundary surface MN, are refracted such that the light rays are only transmitted within the dotted region J shown in FIG. 4.

Figure 7:
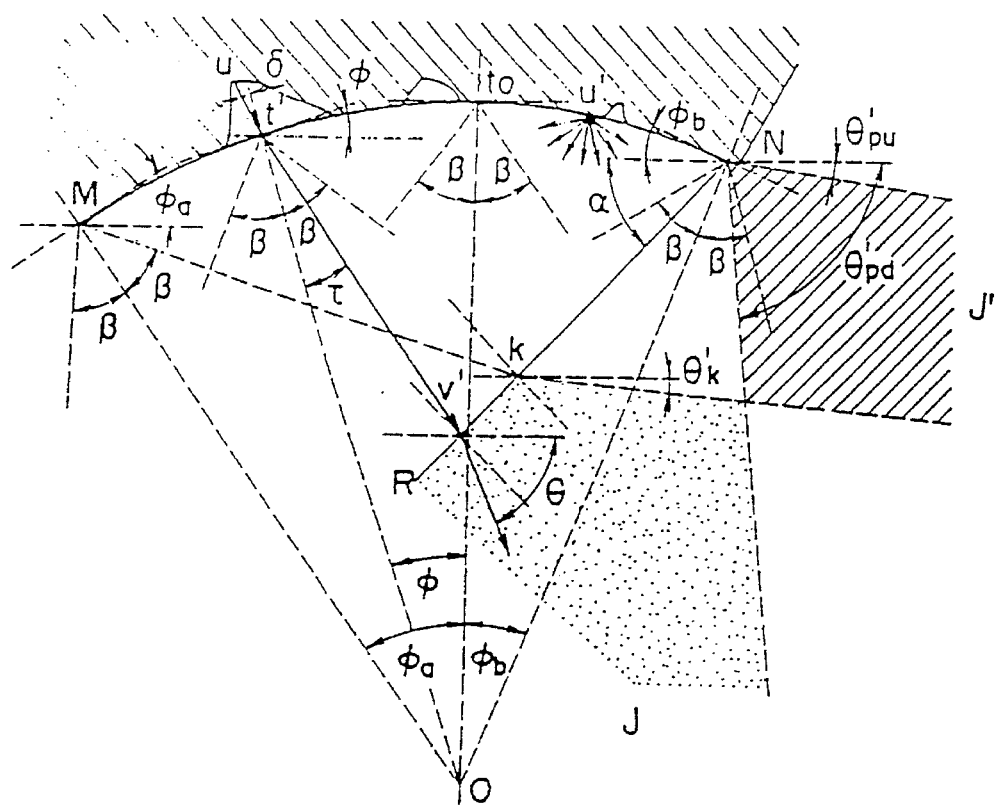
FIG. 7 shows a ray diagram of a light path when a palm is placed on the prism.

FIG. 7 shows a palm (at the top of the drawing) contacting the boundary surface MN. As shown in FIG. 7, some portions of the palm directly contact the boundary surface MN while other portions, and more specifically, the lines and wrinkles of the palm, do not contact the boundary surface MN.

Therefore, light reflected by the non-contacting lines and wrinkles, follows the light path shown in FIG. 6. In FIG. 7, point U is the point on a palm line where light is reflected. The reflected light is incident at point t' at an angle of incidence δ, and is refracted into the prism at angle τ. Therefore, for all light rays reflected by the palm lines, the reflected rays which are incident on the boundary surface MN are refracted into the prism such that $0 \leq \tau \leq \beta$. The light ray then emerges from the boundary surface RN at point v'. The emerging angle θ, which is measured with respect to the tangent at $t_0$ is given by equation (2a) below:

$$\theta = (\pi/2) - \alpha + \sin^{-1}\{n \sin(\alpha - \tau - \phi)\} \quad (2a)$$

This is similar to equation (2) above, except that in the previous case, the light is totally internally reflected. Therefore, the emerging angle θ depends on the angle of reflection and correspondingly the angle of incidence γ on the boundary surface MN. However, when the angle of incidence γ is less than the critical angle β, the emerging angle θ depends on the angle of refraction τ of the ray refracted by boundary surface MN, as shown in FIG. 7, which is different than the angle of incidence γ. Therefore, equation (2a) uses the angle of refraction τ.

As described above and for FIG. 6, the emerging light rays do not enter the hatched region J' (or region (4) as shown in FIG. 2). Thus, the light rays from the wrinkles and lines of the palm, peripheral areas of the fingers and from the background do not travel into the hatched region J' in FIG. 7.

On the other hand, at an arbitrary point u' on the boundary surface MN, where portions of the palm contact the boundary surface MN, the reflected light rays are scattered in all directions within the prism. This is because the refractive index of the palm is different than that of air, and therefore the critical angle β is also different. More specifically, the refractive index of the palm is higher than that of air, and thus the critical angle β as given by equation 1 is also larger.

Therefore, some of the rays emerge in the hatched region J' while other rays emerge in the dotted region J. Thus, light reflected by points on the boundary surface MN which directly contact the palm can be detected in the hatched region J', while light reflected by the lines and wrinkles of the palm which do not contact the boundary surface MN will not be detected in hatched region J'. Therefore, for accurate imaging of the line pattern of the palm, an image sensor should be located in the hatched region J'.

Figure 8:
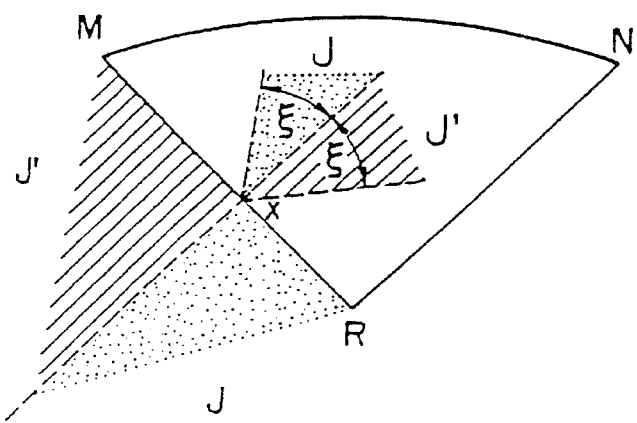
FIG. 8 is a ray diagram showing a region where light can be incident on a plane MR of the prism.

FIG. 8 shows light rays incident on boundary surface MR of the prism. The light rays incident at point x on the boundary surface MR and which passed through the hatched region j' are refracted into the hatched region J' in the prism. Similarly, the light rays incident at point x on the boundary surface MR and which passed through the dotted region j are refracted into the dotted region J in the prism. These regions are the areas covered by the angles ξ on both sides of the normal line at point x. The angle ξ is a critical angle given by equation (3) and which is similar to equation (1).

$$\xi = \sin^{-1}(1/n) \quad (3)$$

Since the refractive index n is the same as that in equation (1), the critical angle β equals the angle ξ.

In the above descriptions, a single light ray has been used to illustrate the path taken by the light. However, in the actual embodiments, a converging lens is used to converge a flux of light. Thus, the boundary rays of the light flux must be considered when determining the location of the image sensor.

Based on the analysis described above, the positioning of a light source and the image sensor can be classified into three configurations.

In the first configuration, the light source is placed such that the light rays are incident on the boundary surface MN with an incident angle that is greater than the critical angle. The image sensor is placed in the hatched region J' which is at angle greater than the critical angle. Therefore, light which is incident on the boundary surface where the palm directly contacts the boundary surface will be scattered in all directions, whereas all the light which is incident on the boundary surface where the palm does not contact the boundary surface will be reflected towards the image sensor.

In the image detected by the image sensor, the gray areas correspond to portions of the palm which directly contact the boundary surface MN, whereas the white areas correspond to the lines and wrinkles of the palm which do not contact the boundary surface MN.

In the second configuration, the light source is placed such that the light rays are incident on the boundary surface MN with an incident angle that is greater than the critical angle. The image sensor is placed in an area where the totally internally reflected light rays are not reflected, (i.e., an area which is equivalent to the dotted region J), and on the same side of the prism as the light source. Similar to the first configuration described above, light which is incident on the boundary surface where the palm directly contacts the boundary surface, will be scattered in all directions. However, light which is incident on the boundary surface where the palm does not contact the boundary surface, will be reflected away from the image sensor.

In the image detected by the image sensor, the gray areas correspond to portions of the palm which directly contact the boundary surface MN, whereas the black areas correspond to the lines and wrinkles of the palm which do not contact the boundary surface MN.

In the third configuration, the light source is placed such that the light rays are incident on the boundary surface MN with an incident angle that is less than the critical angle. The image sensor is placed in the hatched region J' which is at angle greater than the critical angle.

Similar to the second configuration described above, light, which is incident on the boundary surface where the palm directly contacts the boundary surface, will be scattered in all directions. The light, which is incident on the boundary surface where the palm does not contact the boundary surface, will be reflected outside of the hatched region J' as shown in FIG. 5, and therefore, away from the image sensor.

In the image detected by the image sensor, the gray areas correspond to portions of the palm which directly contact the boundary surface MN, whereas the black areas correspond to the lines and wrinkles of the palm which do not contact the boundary surface MN.

In the second and third configurations, the detected images may appear to be the same. However, due to the difference in the angles of incidence of the light from the light source, the third configuration results in more of the scattered light rays reflected by the portions of the palm which directly contact the boundary surface MN being detected by the image sensor. Therefore, a higher contrast image can be obtained using the third configuration.

Figure 9:
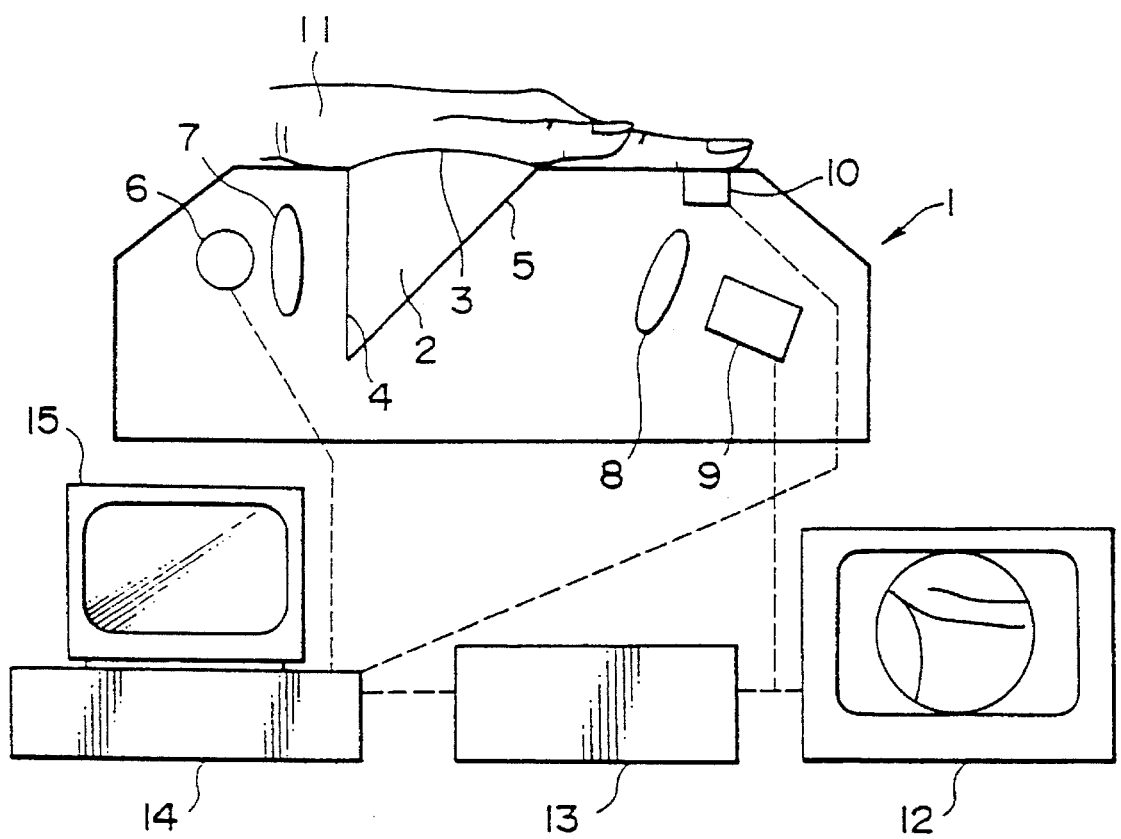
FIG. 9 shows a schematic drawing of a prism, light source and detector according to a first embodiment of the present invention.

FIG. 9 shows a first embodiment of an image detecting apparatus I according to the present invention.

The image detecting apparatus 1 includes a prism 2, a light source 6, a projection lens 7, an image forming lens 8, an image sensor 9 and a switch 10.

The prism 2 has a plane surface 4 through which light enters the prism 2 from the light source 6; a plane surface 5 through which light leaves the prism 2 and is detected by the image sensor 9; and a detecting surface 3 which is curved, and upon which palm 11 is placed.

An image of the palm 11 is detected by the image sensor 9, and data corresponding to the detected image is displayed on a monitor 12, stored in a memory 13 and processed using a computer 14.

The light source 6 can be a fluorescent lamp, an incandescent lamp, a light-emitting diode, an electroluminescent lamp, a laser unit or any other type of light source. The image sensor 9 is a CCD sensor or a similar type of image sensing device which can detect an optical image and output an electrical signal.

Figure 10:
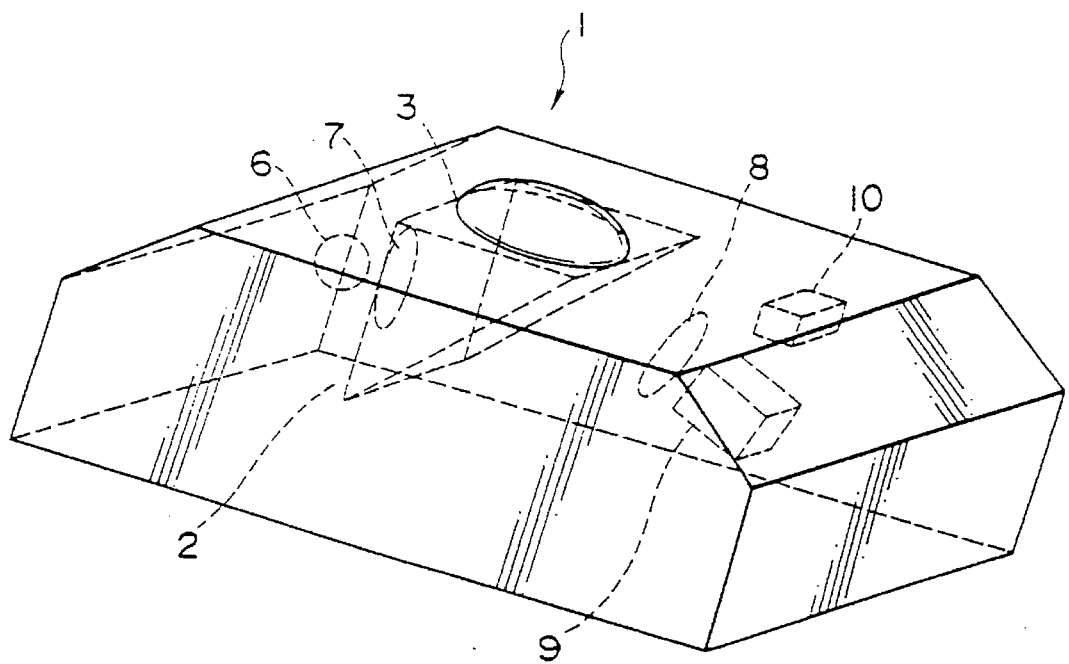
FIG. 10 shows a perspective view of the prism, light source and detectors shown in FIG. 9.
Figure 11:
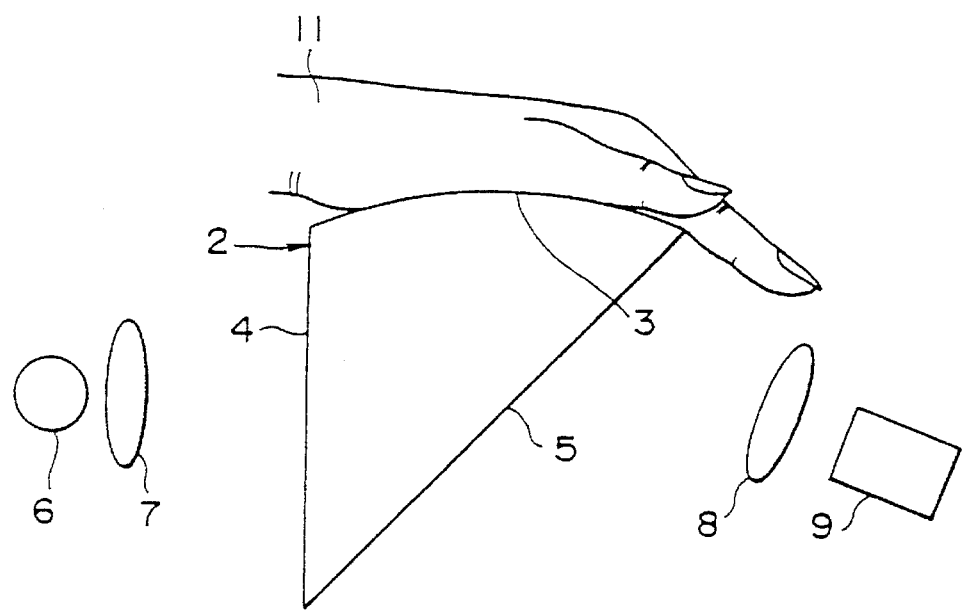
FIG. 11 shows an image detecting apparatus having the prism, the light source and the detector arrangement of FIG. 9.

FIG. 10 shows a perspective view of the arrangement of the above elements. FIG. 11 shows a side schematic view of the arrangement of the above elements.

In this first embodiment, as shown in FIG. 11, the elements are arranged to satisfy the third configuration described above. The light source 6 and projecting lens 7 are positioned such that the light rays enter plane surface 4 at an incident angle of 0°, are reflected at right angles by the inside surface of plane surface 5 which is opposite to plane surface 4, and then are incident on the curved surface 3. A part of the light rays scattered by the curved surface 3 corresponding to the region of the palm 11 which contacts the curved surface 3, is incident on the image forming lens 8 and image sensor 9. Since the image forming lens 8 and the image sensor 9 are positioned in the angular region, whose inside boundary is at an angle to the normal which is greater than the critical angle of incidence, then the light rays reflected from the curved surface 3 in the regions where the palm 11 does not contact the curved surface 3 are not detected by the image sensor 9.

switch 10 is used to initiate an operation where the palm is illuminated and the reflected image is detested. The switch 10 is located so that it is activated by a finger tip when the palm 11 is placed on the curved surface 3. The switch 10 can be a simple push button, a photoelectric switch that senses the finger tip photoelectrically, or a static switch that senses the finger tip by a change in capacitance. The location of switch 10 is not limited to the position shown in FIGS. 9 and 10. Further, the switch 10 can be omitted if another method of actuating the image detecting apparatus 1 is provided, such as a keypad for entering an ID number.

Data output from the image sensor 9 is displayed on the monitor 12 as well as stored in the memory 13. The computer 14 retrieves data stored in the memory 13, and then extracts significant values from the data.

The computer 14 can also store the extracted significant values in order to register different individuals who may use the system. Further, during a verification stage, the data that is detected can be compared with registered data, and a determination is made as to whether the individual is a registered user. This process of registering and verifying an individual wall be explained later.

The monitor 12 serves to confirm data detected, primarily during the registration of individuals, and is not needed when image detecting apparatus 1 is used only to verify an identity. The display 15 may be used to show the operational flow during the registration stage and to show the confirmation information and other information during the verification stage.

Figure 12:
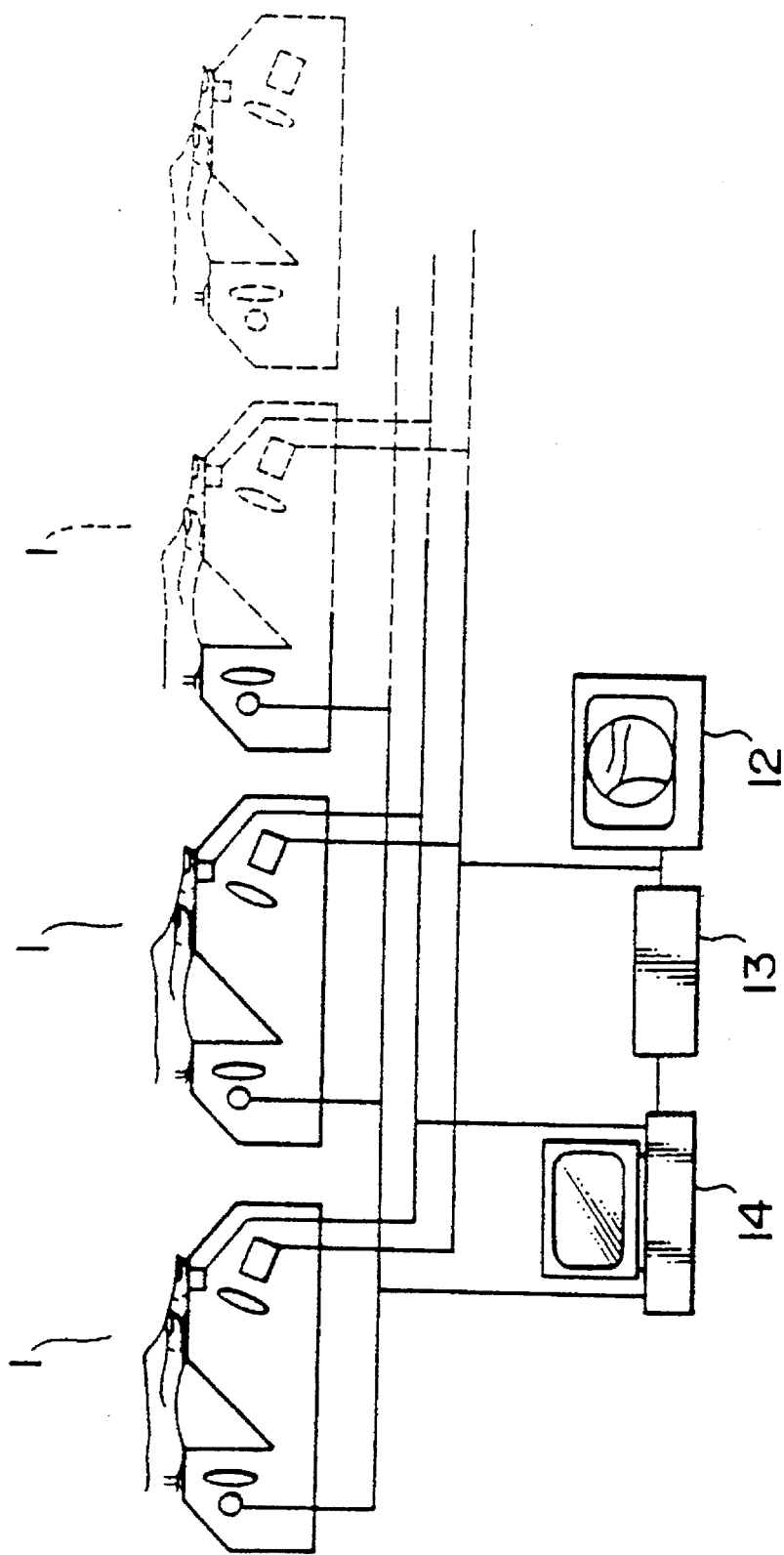
FIG. 12 shows a network of image detecting apparatuses controlled by a single computer.

FIG. 12 shows a network of image detecting apparatuses 1 connected to a single monitor 12, a memory 13 and a computer 14. This network could be used in a security system to verify the identities of individuals seeking access to a secure area. Each image detecting apparatus 1 would be provided next to a door, and authorization would be given by the computer 14.

Figure 13:
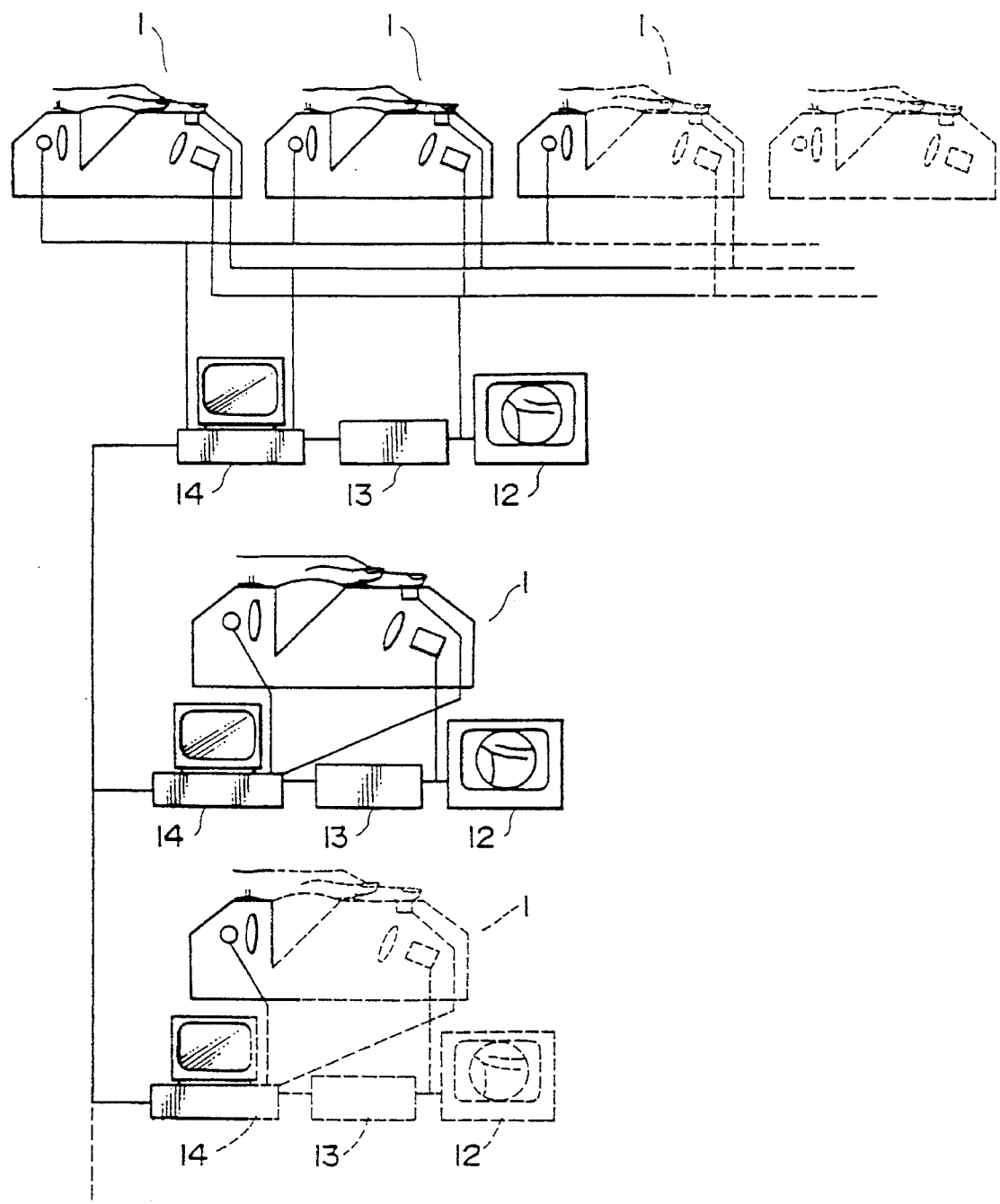
FIG. 13 shows a network of image detecting apparatuses controlled by more than one computer.

A more complex system my be constructed by linking the networks shown in FIG. 12, together. This is shown in FIG. 13. In this system, several computers 14 are linked together in a network so that data related to the identities of individuals can be shared. This results in an individual whose identity is registered on one computer to have access to all secured areas controlled by all the computers 14.

The operation of the image detecting apparatus 1 will be described with reference to FIGS. 14A and 14B.

Figure 14A:
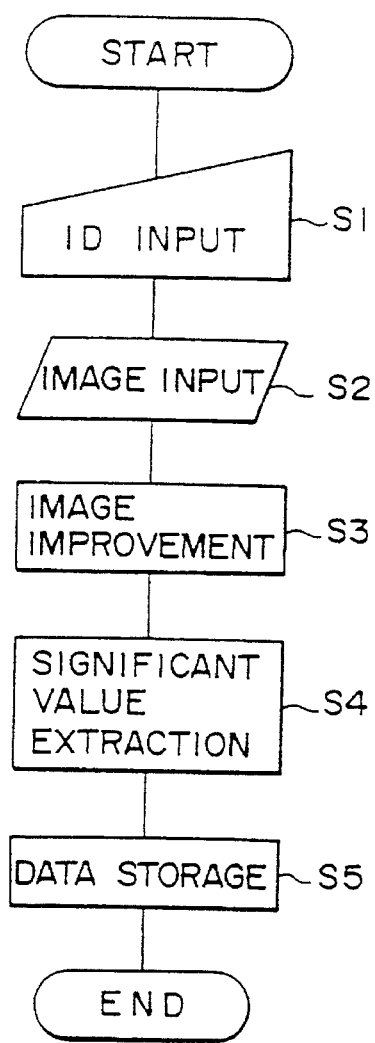
FIGS. 14A and 14B show flow charts of operational flow according to the present invention.

FIG. 14A describes the processes of registering (storing palm line pattern data in a database) data for an individual.

In step S1, the entry of an ID number for identification of a particular individual is requested. ID numbers may be entered through a keyboard, or by reading a magnetic card or another ID card. After entering the ID number, the palm 11 is placed on the curved surface 3 and the light source 6 is turned on in step S2 when the switch 10 detects the presence of a finger. An image of the palm line pattern of the palm 11 is then detected. The control of the registering operations may be initiated either by the operation of the image detecting apparatus 1 or triggered by the entry of the ID number at step S1.

At step S2, the image of the palm line pattern is transmitted through image forming lens 8 and detected by image sensor 9. The data output by image sensor 9 is stored in memory 13. Upon completion of the image input operation, an indicator (not shown) informs the individual that the input of the palm line pattern image is completed. The registration may be observed on the monitor 12 to judge if a good quality image has been obtained and if not, the image input operation may be repeated until a good quality image is obtained.

Figure 15A:
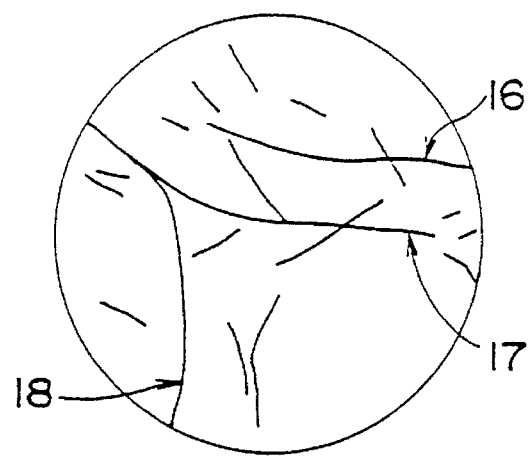
FIG. 15A shows a palm line pattern detected by the detector.
Figure 15B:
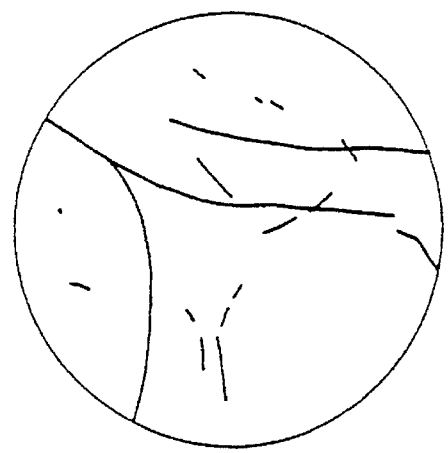
FIG. 15B shows a digitized image of the palm line pattern shown in FIG. 15A.
Figure 15C:
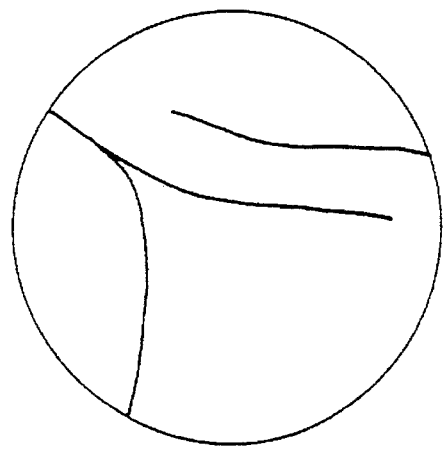
FIG. 15C shows the digitized image of FIG. 15B after it has undergone an expansion/reduction process.

At step S3, the image data stored in the memory 13 is processed by the computer 14 to improve the image quality. FIG. 15A shows an example of image data detected by the image sensor 9. The palm line pattern image includes many fine lines as well as the three main palm lines 16, 17 and 18. The palm line pattern image data is then digitized and processed to remove the fine lines, as shown in FIG. 15B. Then the palm line pattern image data is expanded or reduced to further enhance the image, as shown in FIG. 15C. Although FIG. 15C shows only the three main palm lines, other palm lines may be included, even after the expansion/reduction process, in order to provide more information about the identity of an individual.

At step S4, significant points indicated by numbers (1) through (6) in FIG. 16 are sampled by a line tracing method etc. to extract significant values. Significant points may be classified as terminal points (1), (3)–(6) and Joints (2), and are numbered in sequence from the innermost circle to the outermost circle, as shown in FIG. 17.

Significant values may be: the numbers or the spatial coordinates of the significant points indicated by the black dots in FIG. 16; the spatial coordinates of the dividing points which divide branches extended from each significant points indicated by asterisks in FIG. 17; vectors of the branches indicated by arrows or relationships of the significant point connections shown in FIG. 18; the angles between vectors, as indicated by a to d in the FIG. 18, and/or the angles (setting the base line h=0 in this example) between the straight line segments connecting the dividing dots, as indicated by e to i in FIG. 19. These significant values can be applied individually or in combination as the information for identifying.

At step S5, the extracted significant values are stored and the registration stage is ended. The values may be recorded on a magnetic disc or a similar recording means along with the ID number, and stored in a database. The database will be used for verifying the identity of the individual at a later time.

Figure 14B:
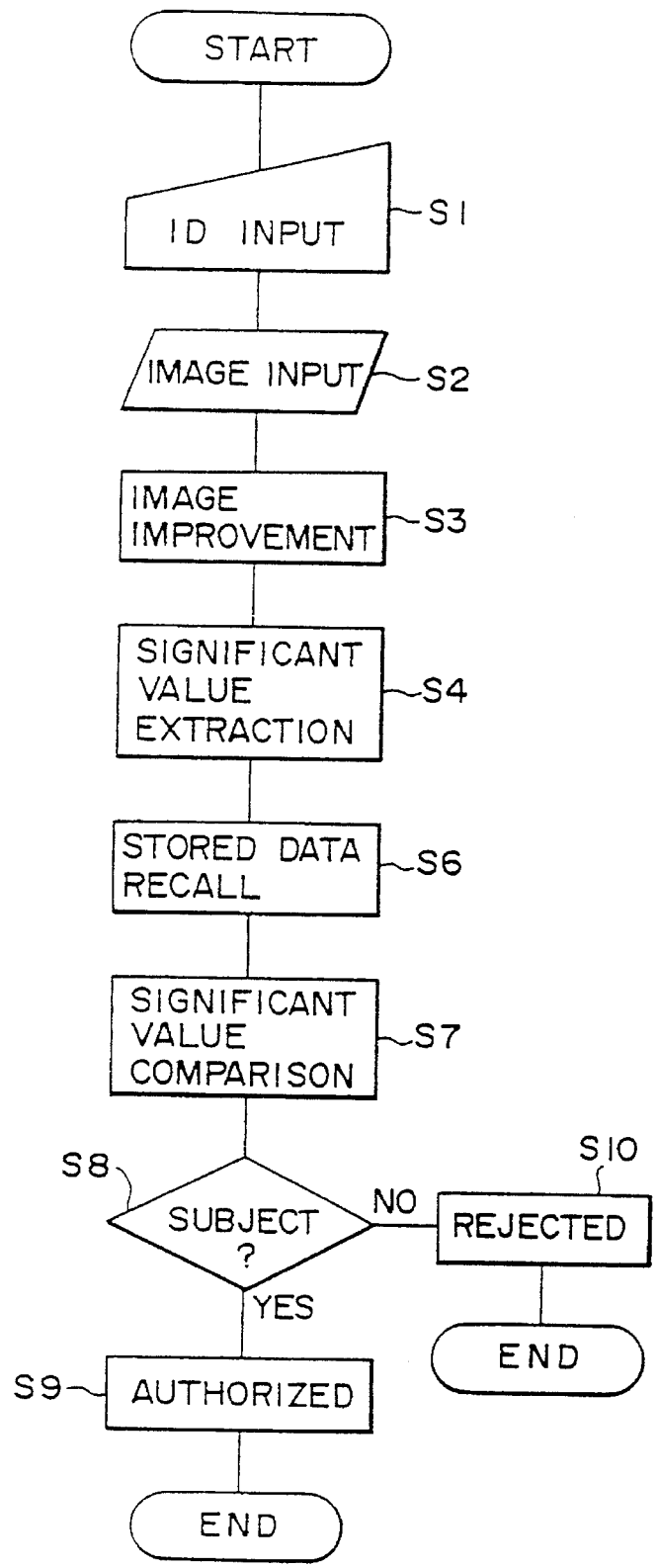

FIG. 14B shows a procedure for verifying the identity of an individual. Steps S1 through S4 are similar to those described for the registration stage and will not be described below.

At step S6, the significant values specific to the identity of the individual being verified are recalled from the stored data using the ID number as a key word. At step S7, the significant values recalled from the database are compared with the significant values extracted from the input data. When the data is being compared, certain allowance may be given to the exact matching of the images because some rotation of the palm 11 will occur, resulting in slightly different data being detected than that stored during the registration. The verification step may be repeated several times in order to overcome differences in the detected data due to movement of the palm 11.

At step S8, it is determined whether the identity of the individual is verified. If the identity of the individual is verified (S8:YES) then control goes to step S9 and the system allows the individual access to a secure area. If the identity of the individual cannot be verified (S8:NO), control goes to step S10 where the system denies access to a secure area.

In the embodiment described above, the image data is processed and the significant values are determined. Then, the significant value data are compressed and stored. By compressing the significant value data, the time required to verify the identity of an individual can be shortened.

A second embodiment according to the present invention is described in FIG. 20. In this second embodiment, the light source 6, the projection lens group 7, the image forming lens 8 and the image sensor 9 are arranged according to the second configuration described above. Light from light source 6 is incident on plane surface 5 and refracted to be incident on curved surface 3. The light rays, which have angle of incidence on curved surface 3 which are greater than the critical angle, are totally internally reflected by the portions of the curved surface 3 which do not contact the palm 11 and emerge through the plane surface 4 on the other side of the prism 2. The light rays, which are incident on the portions of the curved surface 3 which do contact the palm 11, will be reflected in all directions. Therefore, some of these reflected light rays will emerge through plane surface 5 and will be incident on the image forming lens 8 and the image sensor 9.

Therefore, in the palm line pattern image detected by the image sensor 9, the gray areas correspond to portions of the palm 11 which directly contact the curved surface 3, whereas the black areas correspond to the lines and wrinkles of the palm 11 which do not contact the curved surface 3.

Figure 21:
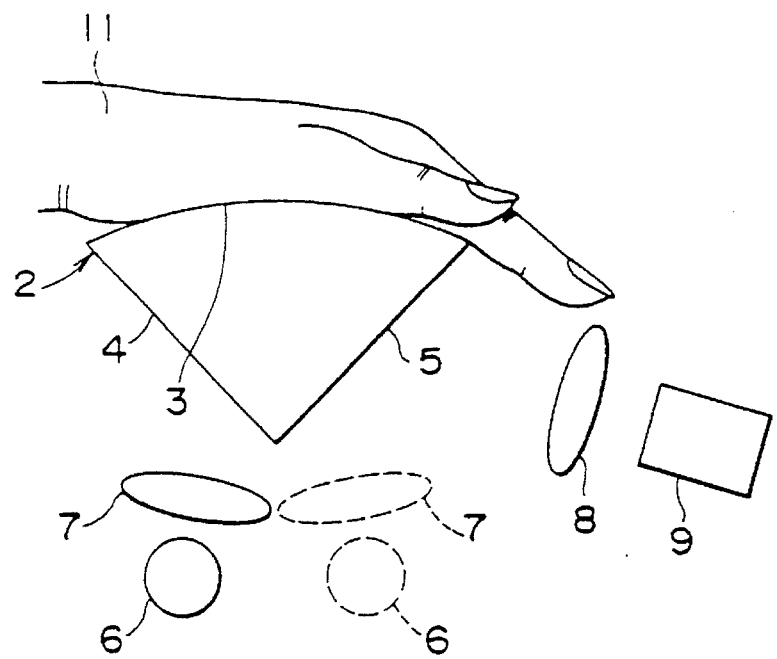
FIG. 21 shows a schematic drawing of a prism, light source and detector according to a third embodiment of the present invention.

FIG. 21 shows a third embodiment according to the present invention. In this embodiment, the elements are arranged according to the third configuration described above. Therefore, the light source 6 and projection lens 7 are arranged such that the light rays are incident on plane surface 4 and then refracted such that they are incident on curved surface 3 at an angle smaller than the critical angle.

The image forming lens 8 and image sensor 9 are positioned such that they only receive light which is reflected at an internal side of curved surface 3 with an angle greater than the critical angle. This is similar to the positioning described for the first embodiment above.

The light rays, which are incident on the curved surface 3 which does not contact the palm 11, are partially reflected to thereby emerge through the plane surface 5, and are partially transmitted to be incident on the surface of the palm 11 which does not contact the curved surface 3.

The light rays, which are incident on the curved surface 3 which contacts the palm 11, are reflected in all directions. Since the image forming lens 8 and the image sensor 9, are positioned in the angular region whose inside boundary is at an angle to the normal which is greater than the critical angle of incidence, the image sensor 9 does not receive the light rays reflected from the region where the palm 11 does not contact the curved surface 3; the image sensor 9 only receives the scattered light rays from the region where the palm 11 contacts the curved surface 3 and which emerges through the plane surface 5.

To satisfy the conditions of the third configuration described above, the light source 6 and the projection lens 7 may be positioned so that the light rays are incident on the plane surface 5 as shown by the broken lines in FIG. 21. Further, both light sources 6 and projection lenses 7 indicated by the solid and broken lines can be used at the same time.

Figure 22:
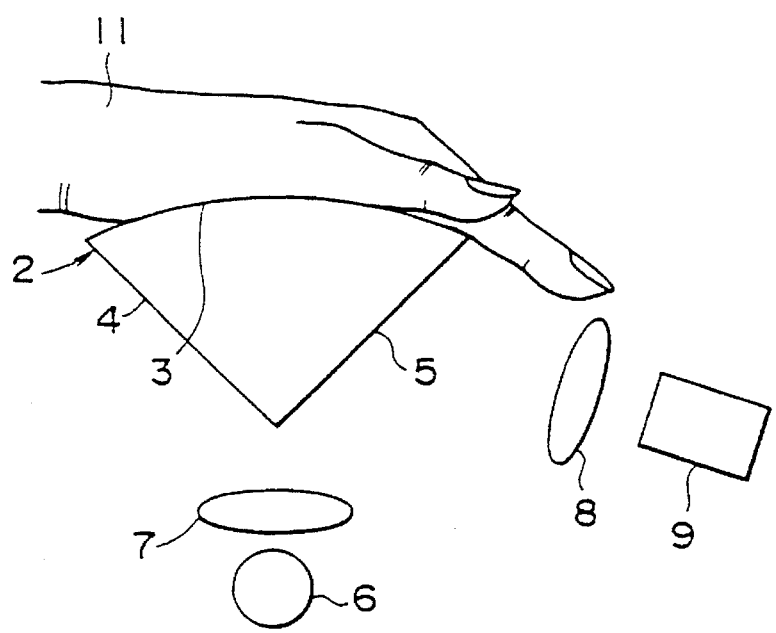
FIG. 22 shows a schematic of a variation of the third embodiment shown in FIG. 21.

FIG. 22 shows another variation of the third embodiment where the light source 6 and projecting lens 7 is placed below the prism 2. In all of these cases, the image sensor 9 must be positioned carefully to avoid detection of light rays that are initially reflected by the plane surface 5.

Figure 23:
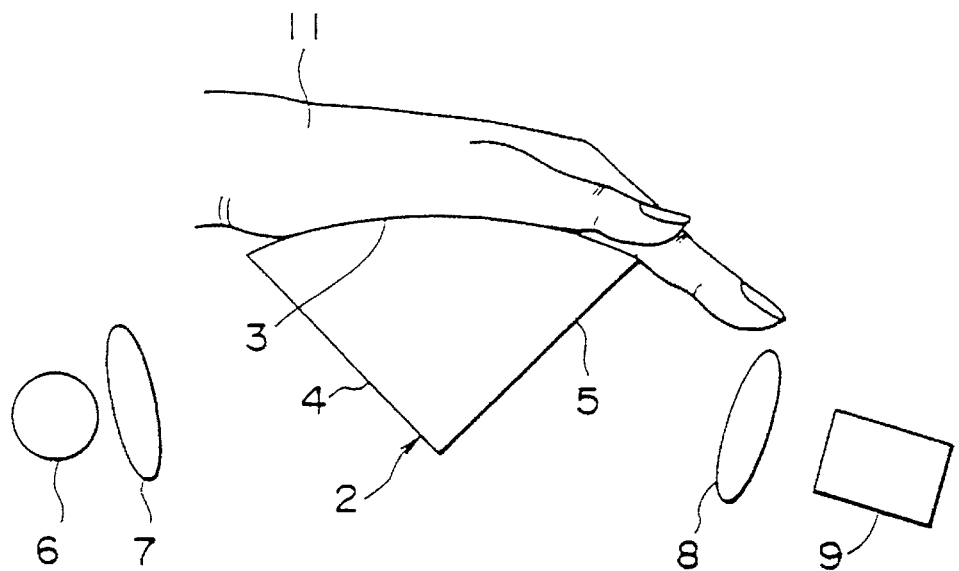
FIG. 23 shows a schematic drawing of a prism, light source and detector according to a fourth embodiment of the present invention.

FIG. 23 shows a fourth embodiment of the present invention. In this embodiment, the elements are arranged according to the first configuration described above. Therefore, the light, which is emitted by the light source 6 and refracted by projecting lens 7, is incident on the curved surface 3 such that the angle of incidence is larger than the critical angle. Further, the image forming lens 8 and image sensor 9 are positioned such that they only receive light which is reflected at an internal side of curved surface 3 with an angle greater than the critical angle.

Therefore, light which is incident on the curved surface 3 which is in contact with the palm 11 will be scattered in directions, whereas all light which is incident on the curved surface 3 which is not in contact with the palm 11 will be reflected towards the image sensor 9.

In the above embodiments, a triangular prism 2 has been employed. However, the prism 2 is not limited to this shape. The prism 2 may be a trapezoid, a pyramid or trapezoidal pyramid or any other form, provided it satisfies the conditions of one of the three configurations described above.

Figure 24:
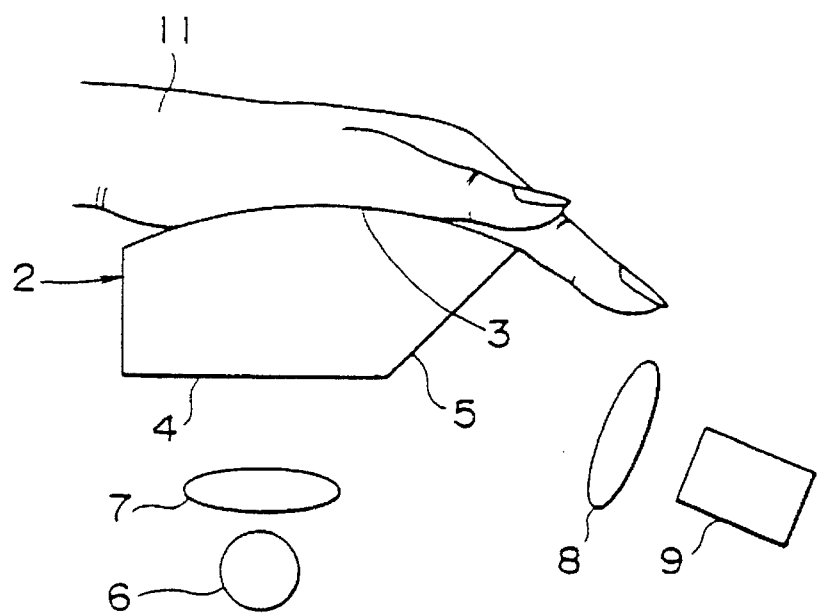
FIG. 24 shows a schematic drawing of a prism, light source and detector according to a fifth embodiment of the present invention.
Figure 25:
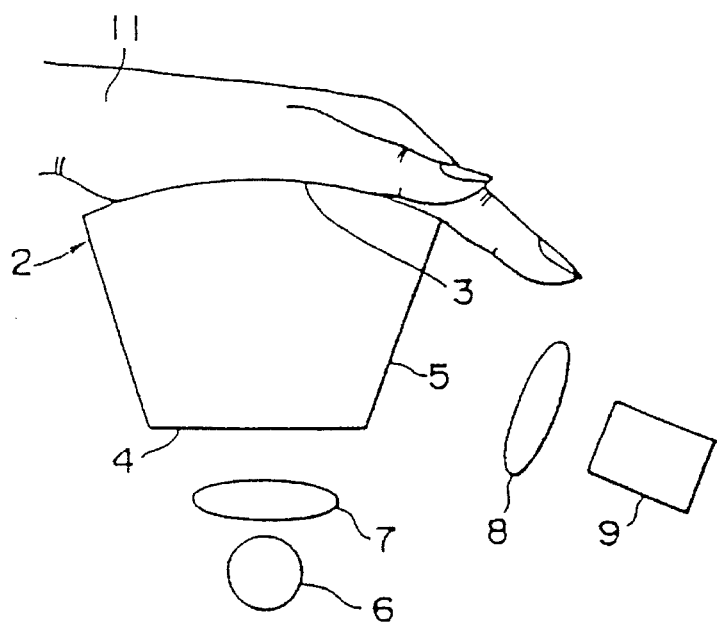
FIG. 25 shows a schematic drawing of a prism, light source and detector according to a sixth embodiment of the present invention.

A fifth embodiment shown in FIG. 24 and a sixth embodiment shown in FIG. 25 employ a prism 2 having different shapes.

In the fifth and sixth embodiments the light rays are incident on the plane surface 4 to thereby enter prism 2 at the bottom, as shown in FIGS. 24 and 25. The light rays are then incident on the curved surface 3. The light rays incident on curved surface 3 where the curved surface 3 contacts the palm 11, are reflected in all directions, as described before. The reflected light is then incident on the image forming lens 8 and is detected by the image sensor 9.

For the light rays that are incident on the curved surface 3 in regions where the palm 11 does not contact the curved surface 3, a portion of the light is reflected, and a portion of the light is refracted, as described before in the first embodiment. Further, since the image forming lens 8 and the image sensor 9 are positioned in the angular region whose inside boundary is at an angle to the normal which is greater than the critical angle of incidence, then the light rays, reflected from the curved surface 3 in the regions where the palm 11 does not contact the curved surface 3, are not detected by the image sensor 9.

Figure 26:
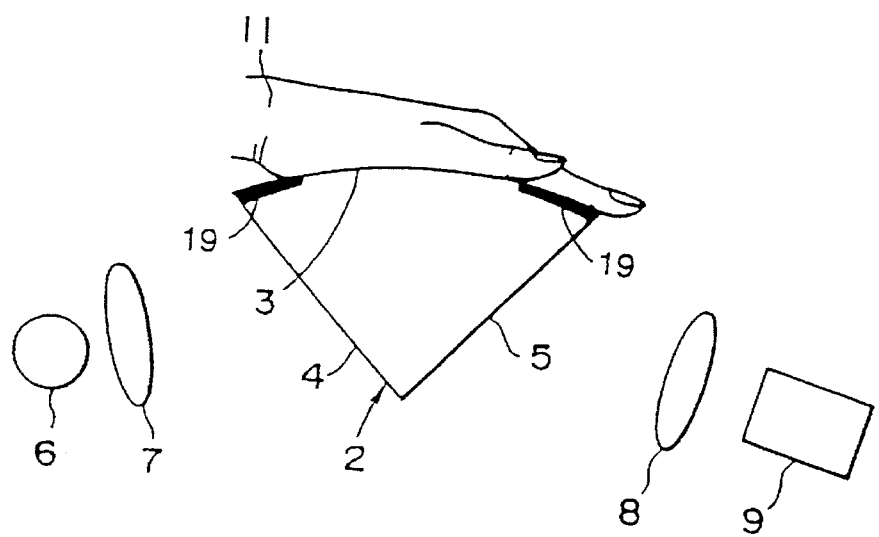
FIG. 26 shows a schematic drawing of a prism, light source and detector according to an seventh embodiment of the present invention.

The seventh embodiment shown in FIG. 26, is similar to the fourth embodiment shown in FIG. 23, except that light buffers 19 are placed at the edges of the curved surface 3 to limit the area of the curved surface 3 that is illuminated. When the light buffers 19 are used, the area of the curved surface 3 that is illuminated becomes smaller. Therefore, the inside boundary of the region, which defines the acceptable positioning of the image sensor 9, can be brought closer to the center of the prism. In other words, the area, where the image sensor 9 can be positioned and still properly detect the palm line pattern image, becomes larger.

The light buffers 19 can also be used as a guide for positioning the palm 11 on the curved surface 3.

This seventh embodiment shows the use of light shading member 19 with the first embodiment described above. However, the light shading member 19 can be used with all of the embodiments described above.

Figure 27:
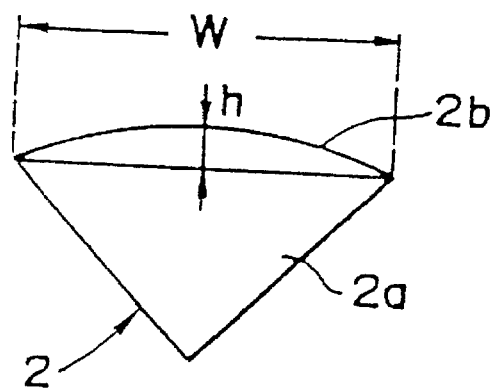
FIG. 27 shows a drawing of a prism formed by combining two prisms having different shapes.

For all of the embodiments described above, the prism 2 has been described as a single block. However, a combination of two prisms may be used in order to achieve the desired shape. FIG. 27 shows prism 2 which includes a triangular prism 2a and a spherical prism 2b which are joined together to form a plano-convex prism. The shape of the curved surface 3 is not limited to spherical but can be aspheric in rotatory symmetry, ellipsoidal, or aspheric in non-symmetry of revolution.

The height h, between the edge and the middle of the curved surface 3 (see FIG. 27) to the top of the curved surface, should be designed so that the curved surface 3 fits a cupped palm. In general, height h is preferably in the range 2 mm to 8 mm.

The diameter w of the curved surface 3 should be in the range of 45 mm to 75 mm. The diameter w is applicable to the diameter of the curved surface 3 being illuminated, and is used to detect the image of the palm 11. Therefore, diameter w excludes the portions of curved surface 3 which are shielded by light shading members 19 shown in the seventh embodiment.

Figure 28:
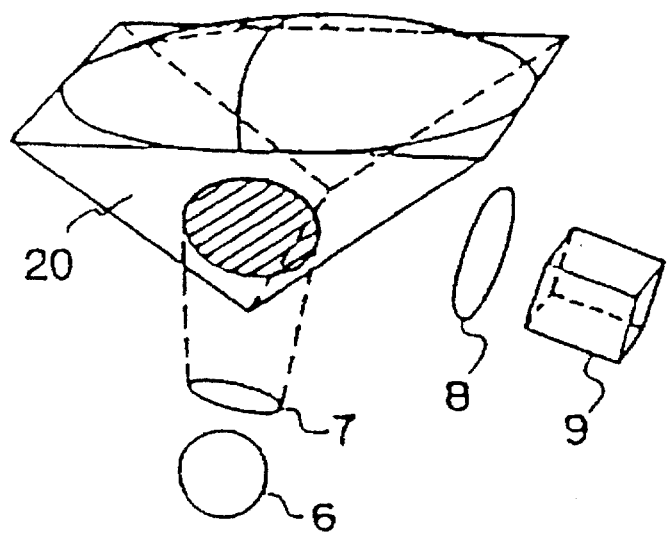
FIG. 28 shows a three dimensional view of the prism of FIG. 20 illuminated through a plane perpendicular to the plane of illumination shown in FIG. 20.

In the embodiments described above, the light source 6 emits light to be incident on plane surfaces 4 or 5 depending on which configuration is selected. However, it is possible that the light source 6 is positioned to be incident on plane surface 20 (FIG. 28), provided that the light can be refracted to be incident on curved surface 3, thereby having an angle of incidence that satisfies the conditions described above for the respective configurations. An example of this is shown in FIG. 28.

As described above, the present invention provides a curved surface onto which a palm is placed. Then, by illuminating the curved surface and detecting light reflected by the curved surface, a pattern of the lines on the palm can be detected. Further, by positioning the image sensor in an area that is outside the path of light reflected by the curved surface as a result of total internal reflection, the background light can be shielded, thereby improving the contrast of the image detected by the image sensor.

The present invention provides an image detecting apparatus which has a simple construction and which can quickly and accurately verify the identity of an individual. By using palm line pattern images, the image detecting apparatus provides an easy method of identifying individuals since the individual merely has to place his palm on the apparatus. Further, since palm line patterns are easier to detect than fingerprints, or eye retina patterns, the process of verifying identities can be accomplished very quickly.

The present disclosure relates to subject matter contained in Japanese Patent Application Nos. HEI 5-145953 filed on Jun. 17, 1993, and HEI 5-148775 filed on Jun. 21, 1993, which are expressly incorporated herein by reference in their entireties.

What is claimed is:

1. An image detecting apparatus used to detect an image of a pattern of lines on a palm, comprising:

an optical transparent block having an index of refraction which is greater than an index of refraction of a medium surrounding said optical transparent block, said optical transparent block having a convex curved surface curved in three dimensions and shaped to fit the palm, on which the palm is placed such that said convex curved surface contacts substantially an entire area of the palm;

light emitting means for emitting light towards said convex curved surface, said light emitting means positioned such that said emitted light is incident on said convex curved surface from within said optical transparent block; and image sensing means for detecting at least light reflected by said convex curved surface.

2. The image detecting apparatus according to claim 1, a portion of said palm corresponding to said lines remaining out of contact with said convex curved surface, and another portion of said palm directly contacting said convex curved surface.

3. The image detecting apparatus according to claim 2, said light emitting means being arranged such that an incident angle of light emitted by said light emitting means is greater than a critical angle of said optical transparent block for every point on said convex curved surface, and said image sensing means being arranged such that only said reflected light having a reflection angle greater than said critical angle is detected.

4. The image detecting apparatus according to claim 3, said light emitting means and said image sensing means being located on opposite sides of said optical transparent block, whereby said image sensing means further receiving light totally internally reflected by said convex curved surface where said portion of said palm is out of contact with said convex curved surface.

5. The image detecting apparatus according to claim 3, said light emitting means and said image sensing means being located on the same side of said optical transparent block, whereby said image sensing means only receiving light which is reflected by said another portion of said palm.

6. The image detecting apparatus according to claim 2, said light emitting means being arranged such that an incident angle of light emitted by said light emitting means is smaller than a critical angle of said optical transparent block at every point on said convex curved surface, and said image sensing means being arranged such that only said light reflected from said another portion of said palm having a reflection angle greater than said critical angle is detected.

7. The image detecting apparatus according to claim 2, said light emitting means comprising a light source and a refracting member, said light source emitting light towards said refracting member which refracts said light towards said convex curved surface.

8. The image detecting apparatus according to claim 7, said light emitting means being arranged such that an incident angle of light emitted by said light emitting means is smaller than a critical angle of said optical transparent block at every point on said convex curved surface, and said image sensing means being arranged such that only said light reflected from said another portion of said palm having a reflection angle greater than said critical angle is detected.

9. The image detecting apparatus according to claim 2, said optical transparent block comprising a prism, said prism comprising said convex curved surface and at least two other surfaces oppositely formed, said image sensing means facing one of said at least two other surfaces.

10. The image detecting apparatus according to claim 9, said light emitting means facing said one of said at least two other surfaces.

11. The image detecting apparatus according to claim 10, said optical transparent block comprising another surface intersecting said at least two other surfaces and said curved surface, and said light emitting means facing said another surface.

12. The image detecting apparatus according to claim 9, said light emitting means facing the other one of said at least two other surfaces.

13. The image detecting apparatus according to claim 1, further comprising light shading means for limiting an area of said convex curved surface.

14. The image detecting apparatus according to claim 1, said medium is air.

15. The image detecting apparatus of claim 1, wherein said substantially an entire area of the palm is scanned at a same time.

16. The image detecting apparatus of claim 1, wherein said convex curved surface is spherical.

17. An individual identifying system, comprising:

an optically transparent block having an index of refraction which is greater than an index of refraction of a medium surrounding said optically transparent block, said optically transparent block having a convex curved surface on which a palm is placed, said convex curved surface being shaped to fit the palm and contacts substantially an entire surface of the palm;

light emitting means for emitting light towards said convex curved surface, said light emitting means positioned such that said emitted light is incident on said convex curved surface from within said optically transparent block;

image sensing means for detecting light reflected by said convex curved surface;

means for extracting characteristics of a pattern of light detected by said image sensing means;

means for storing said characteristics; and means for comparing characteristics of an individual with said characteristics stored in said storing means.

18. The individual identifying system of claim 17, said light emitting means being arranged such that an incident angle of light emitted by said light emitting means is greater than a critical angle of said optical transparent block for every point on said convex curved surface, and said image sensing means being arranged such that only said reflected light having a reflection angle greater than said critical angle is detected.

19. The individual identifying system of claim 17, said light emitting means being arranged such that an incident angle of light emitted by said light emitting means is smaller than a critical angle of said optical transparent block at every point on said convex curved surface, and said image sensing means being arranged such that only said light reflected from said convex curved surface having a reflection angle greater than said critical angle is detected.

20. The image detecting apparatus of claim 17, wherein said substantially an entire surface of the palm is scanned at a same time.

21. The image detecting apparatus of claim 17, wherein said convex curved surface is spherical.

22. An image detecting apparatus used to detect an image of a pattern of lines on a palm, comprising:

an optically transparent block having an index of refraction which is greater than an index of refraction of a medium surrounding said optically transparent block, said optically transparent block having a convex surface with curvature in three dimensions, on which the palm is placed such that said convex surface contacts substantially an entire area of the palm;

light emitting means for emitting light towards said convex surface, said light emitting means positioned such that said emitted light is incident on said convex surface from within said optically transparent block; and image sensing means for detecting at least light reflected by said convex surface.

23. The image detecting apparatus of claim 22, wherein said substantially an entire area of said palm is scanned at the same time.

24. The image detecting apparatus of claim 22, wherein said convex surface is spherical.

* * * * *